(12) United States Patent
Ando et al.

(10) Patent No.: US 7,608,331 B2
(45) Date of Patent: Oct. 27, 2009

(54) CLADOPHORA-FORM CARBON COMPRISING CARBON NANOMATERIALS RADIALLY GROWN ON A SPHERICAL CORE, PROCESS FOR PRODUCING THE SAME AND PRODUCTION APPARATUS

(75) Inventors: Toshihiro Ando, Tsukuba (JP); Kiyoharu Nakagawa, Tsukuba (JP); Mika Gamo, Kawagoe (JP); Hirokazu Oda, Suita (JP)

(73) Assignee: National Institute for Materials Science, Ibaraki (JP)

( * ) Notice: Subject to any disclaimer, the term of this patent is extended or adjusted under 35 U.S.C. 154(b) by 233 days.

(21) Appl. No.: 11/597,361

(22) PCT Filed: May 10, 2005

(86) PCT No.: PCT/JP2005/008833
§ 371 (c)(1),
(2), (4) Date: Nov. 21, 2006

(87) PCT Pub. No.: WO2005/113433
PCT Pub. Date: Jan. 12, 2005

(65) Prior Publication Data
US 2008/0193764 A1     Aug. 14, 2008

(30) Foreign Application Priority Data
May 24, 2004   (JP) .............................. 2004-153129

(51) Int. Cl.
*B32B 5/16*   (2006.01)
*B05D 7/00*   (2006.01)
(52) U.S. Cl. ...................... 428/403; 427/213; 427/215; 427/217
(58) Field of Classification Search .................. 428/403; 427/213, 215, 217
See application file for complete search history.

(56) References Cited

U.S. PATENT DOCUMENTS

2006/0275219 A1* 12/2006 Danjo et al. .................. 424/46

FOREIGN PATENT DOCUMENTS

JP    2003-112050 A    4/2003

(Continued)

OTHER PUBLICATIONS

Fang et al, "Influence of catalyst oxidation on the growth of nitrogen-containing carbon nanotubes for energy generation and storage applications", Diamond & Related Materials 16, (2007) 1140-1143.*

(Continued)

*Primary Examiner*—H. (Holly) T Le
(74) *Attorney, Agent, or Firm*—Westerman, Hattori, Daniels & Adrian, LLP.

(57) ABSTRACT

A fine spherical particle formed of diamond as a core and having carbon nano-materials radially grown therefrom is disclosed, which exhibits the appearance of a Marimo (*Cladophora sauteri*) particle. Fine diamond catalytic particles 2 whose surfaces are oxidized and treated to carry a transition metal catalyst are floated and stirred in a gas phase of hydrocarbon while being heated at a selected temperature to bring about a catalytic reaction which synthesizes carbon nano-materials and to grow them on the surface of said oxidized fine diamond particle. Nano fibers or filaments 32 of a nano size are grown from the fine diamond catalytic particle 31 as a core to form *cladophora*-form carbon. The carbon nano-materials if the supported transition metal is Ni or Co become carbon nano-tubes and if it is Pd become coin stacked carbon nano-graphite.

9 Claims, 12 Drawing Sheets

FOREIGN PATENT DOCUMENTS

| | | |
|---|---|---|
| JP | 2004-277241 A | 10/2004 |
| JP | 2004-277925 A | 10/2004 |

OTHER PUBLICATIONS

Nakagawa et al, "Diamond-supported metal catalyst: a novel medium for hydrogen production from methanol decomposition", Catalysis Letters, vol. 80, No. 3-4, Jun. 2002, pp. 161-164.*

Wikipedia.com, "Marimo", 2009; weblink: http://en.wikipedia.org/wiki/Marimo.*

Statemaster.com, Cladophora, 2009, weblink: http://www.statemaster.com/encyclopedia/cladophora.*

Marimo-web.org, Marimo, 2009; weblink: http://marimo-web.org/en/index/html.*

Translation of International Preliminary Report on Patentability mailed Jan. 18, 2007 of International Application No. PCT/JP2005/008833.

International Search Report of PCT/JP2005/008833, date of mailing Aug. 16, 2005.

* cited by examiner

FIG. 9

| Kind of Transition Metal Catalyst | Yield of Marimo Carbon (mm-mol) |
|---|---|
| Ni / Oxidized Diamond | 108.3 |
| Co / Oxidized Diamond | 83.8 |
| Pd / Oxidized Diamond | 61.2 |
| Fe / Oxidized Diamond | 0.0 |
| Ru / Oxidized Diamond | 0.0 |
| Rh / Oxidized Diamond | 0.0 |
| Ir / Oxidized Diamond | 0.0 |
| Pt / Oxidized Diamond | 0.0 |

FIG. 10

| Reaction Time (Hour) | Marimo Carbon Yield (%) | Diameter ($\mu$m) of Marimo Carbon |
|---|---|---|
| 0.5 | 5.6 | 2.4 |
| 1 | 17.1 | 7.6 |
| 3 | 29.6 | 14.3 |
| 5 | 43.6 | 20.8 |

US 7,608,331 B2

CLADOPHORA-FORM CARBON COMPRISING CARBON NANOMATERIALS RADIALLY GROWN ON A SPHERICAL CORE, PROCESS FOR PRODUCING THE SAME AND PRODUCTION APPARATUS

TECHNICAL FIELD

The present invention relates to *cladophora*-form carbon, i.e., a novel carbon nano-material which exhibits the appearance of a Marimo (*Cladophora sauteri*), a process for producing the same and a production apparatus.

BACKGROUND ART

In recent years, carbon materials having microstructures of nanometer (nm) sizes such as fullerene, carbon nano-tubes and carbon nano-horns, have drawn much attention as next-generation functional materials. These carbon nano-materials are expected of applications as strength reinforcements, electronic materials, electromagnetic absorbent materials, catalysts and optical materials.

In order to reduce the cost of making a carbon nano-material, while investigations have been made on various methods of making carbon nano-materials, the present inventors have proposed a method which enables a carbon nano-material to be made at a markedly reduced cost compared with the conventional arc-discharge and CVD (chemical vapor deposition) methods. See the Japanese Laid-Open Patent Publication JP 2004-277241 A. In this method as shown in FIG. 13, the particle surfaces of a diamond powder on the market are oxidized and then treated to carry a metal catalyst to prepare fine diamond catalytic particles 41, which are placed on a substrate 42. The substrate 42 is arranged in a reaction vessel 43 of a carbon nano-material synthesizer also called a fixed bed flow reactor, in which a hydrocarbon gas 44 is introduced and the substrate is heated in an electric furnace 45 to a catalytic reaction temperature to cause the fine diamond catalytic particles and the hydrocarbon gas to react and the carbon nano-materials to grow on the fine diamond catalytic particles. According to this method, a fine particle formed of diamond as a core and having carbon nano-materials grown thereon can be obtained in a way of extremely reduced cost.

While the method described in JP 2004-277241 A above allows carbon nano-materials to be synthesized in a large quantity at a reduced cost, it gives rise to the problem that the use of the fixed bed flow reactor causes one side of a fine diamond particle as a core necessarily to come in contact with the substrate surface or another diamond particle and impedes the growth of a carbon nano-material at the area of contact with the result that carbon nano-materials are grown anisotropically from the fine diamond particle as the core and hence that the fine particle grown is not spherical. Since carbon nano-materials are thus not grown spherically in shape with their amounts varying depending on shape directions of the fine particle, if the particle is utilized as a catalyst carrier, the amounts of catalyst active species carried thereon vary depending on its shape directions or if such particles are used to form a strength reinforcing material, differences in strength are brought out depending on their shape directions. Thus, if carbon nano-materials with fine particles are used as a strength reinforcing material, an electronic material, an electromagnetic absorbent material, a catalyst material or an optical material, the problem arises that properties of the material vary depending on its positions or directions, namely that the properties are not uniform.

DISCLOSURE OF THE INVENTION

In view of the problems mentioned above, it is a first object of the present invention to provide a fine spherical particle formed of diamond as a core and having carbon nano-materials radially grown therefrom, thereby the property of the material made from carbon nano-material fine particles is uniform. Since this fine spherical particle exhibits the appearance of a *cladophora*-form, such a fine spherical particle will be referred to herein as "Marimo (*Cladophora sauteri*) carbon" as named by the present inventors.

It is a second object of the present invention to provide a method of making a *cladophora*-form carbon.

It is a third object of the present invention to provide an apparatus for making a *cladophora*-form carbon.

In order to achieve the first object mentioned above, there is provided in accordance with the present invention a *cladophora*-form carbon characterized in that it is a fine spherical particle comprising a fine diamond particle whose surface is oxidized, a transition metal catalyst carried on the surface of the oxidized fine diamond particle and carbon nano-materials grown radially from the transition metal catalyst. According to this makeup, since carbon fiber or filament according to the present invention is in the form of a fine spherical particle, the fine particle has no anisotropy in shape. Thus, if the fine particle is utilized as a catalyst carrier, there is no anisotropy in the amount in which catalyst active species is carried, and the catalytic reaction is uniform. Alternatively, if such particles are utilized to form a strength reinforcing material, it has no anisotropy brought above in mechanical strength since each such particle has no anisotropy in shape.

In the makeup mentioned above, said transition metal catalyst may be Ni or Co and then said carbon nano-materials are carbon nano-tubes. Alternatively, if said transition metal catalyst is Pd, then said carbon nano-materials are coin stacked carbon nano-graphite materials.

In order to achieve the second object mentioned above, the present invention provides a method of making a *cladophora*-form carbon, which is characterized in that it comprises: preparing fine diamond catalytic particles whose surfaces are oxidized and have a catalyst of a transition metal carried thereon; and floating and stirring said fine diamond catalytic particles in a gas phase of hydrocarbon while heating them to a catalytic reaction temperature sufficient to synthesize carbon nano-materials and to grow radially carbon nano-materials on the surface of said fine diamond catalytic particle.

In the method mentioned above, if said transition metal carried is Ni or Co, then said carbon nano-materials grown are carbon nano-tubes, and if said transition metal carried is Pd, then said carbon nano-materials grown are coin stacked carbon nano-graphite materials.

Said oxidized fine diamond particle whose surface is oxidized, preferably, has a particle size of not greater than 500 nm. Said hydrocarbon is preferably methane. The catalytic reaction temperature at which to synthesize the carbon nano-materials is preferably a temperature ranging between 400° C. and 600° C.

In order to achieve the third object mentioned above, the present invention provides an apparatus for making a *cladophora*-form carbon, which is characterized in that it comprises: a vertically arranged reaction vessel containing fine diamond catalytic particles; an inlet and an outlet disposed at a lower and an upper part of said vessel for introducing and discharging a gas of hydrocarbon into and from it, respectively; a heating means disposed so as to surround said reaction vessel; and a filter disposed in said reaction vessel for passing said gas while not passing said fine diamond catalytic particles, therethrough.

The apparatus preferably further comprises a gas mixing means for mixing said gas of hydrocarbon with a reaction assisting gas and/or a diluent gas.

According to this makeup in which fine diamond catalytic particles whose surfaces are oxidized and have a catalyst of a transition metal carried thereon are floated with a gas of hydrocarbon introduced through the inlet and discharged through the outlet and are stirred while being heated to a catalytic reaction temperature sufficient to synthesize carbon nano-materials, the carbon nano-materials are allowed to grow radially on the surface of a said fine diamond catalytic particle. Since the fine diamond catalytic particles are floated and stirred in the gas, the carbon nano-materials are allowed to grow radially and uniformly over the entire surface of a said fine diamond catalytic particle to make a fine spherical particle of carbon nano-material, namely, the *cladophora*-form carbon at a reduced cost and in a large quantity.

BRIEF DESCRIPTION OF THE DRAWINGS

In the drawings,

FIG. 9 is a table showing yields of a *cladophora*-form carbon according to the method of making of the present invention;

FIG. 10 is a table showing the dependence on the reaction time of the yield of a *cladophora*-form carbon according to the method of making of the present invention;

BEST MODES FOR CARRYING OUT THE INVENTION

The present invention will better be understood from the following detailed description and the drawings attached hereto showing certain illustrative forms of implementation of the present invention. In this connection, it should be noted that such forms of implementation illustrated in the accompanying drawings hereof are intended in no way to limit the present invention but to facilitate an explanation and understanding thereof.

Mention is first made of an apparatus for making a *cladophora*-form carbon (Marimo carbon) according to the present invention and of a method of making the *cladophora*-form carbon illustratively with reference to this apparatus. Then, based on its specific examples, an explanation will next be given of a *cladophora*-form carbon according to the present invention.

Figure 1:
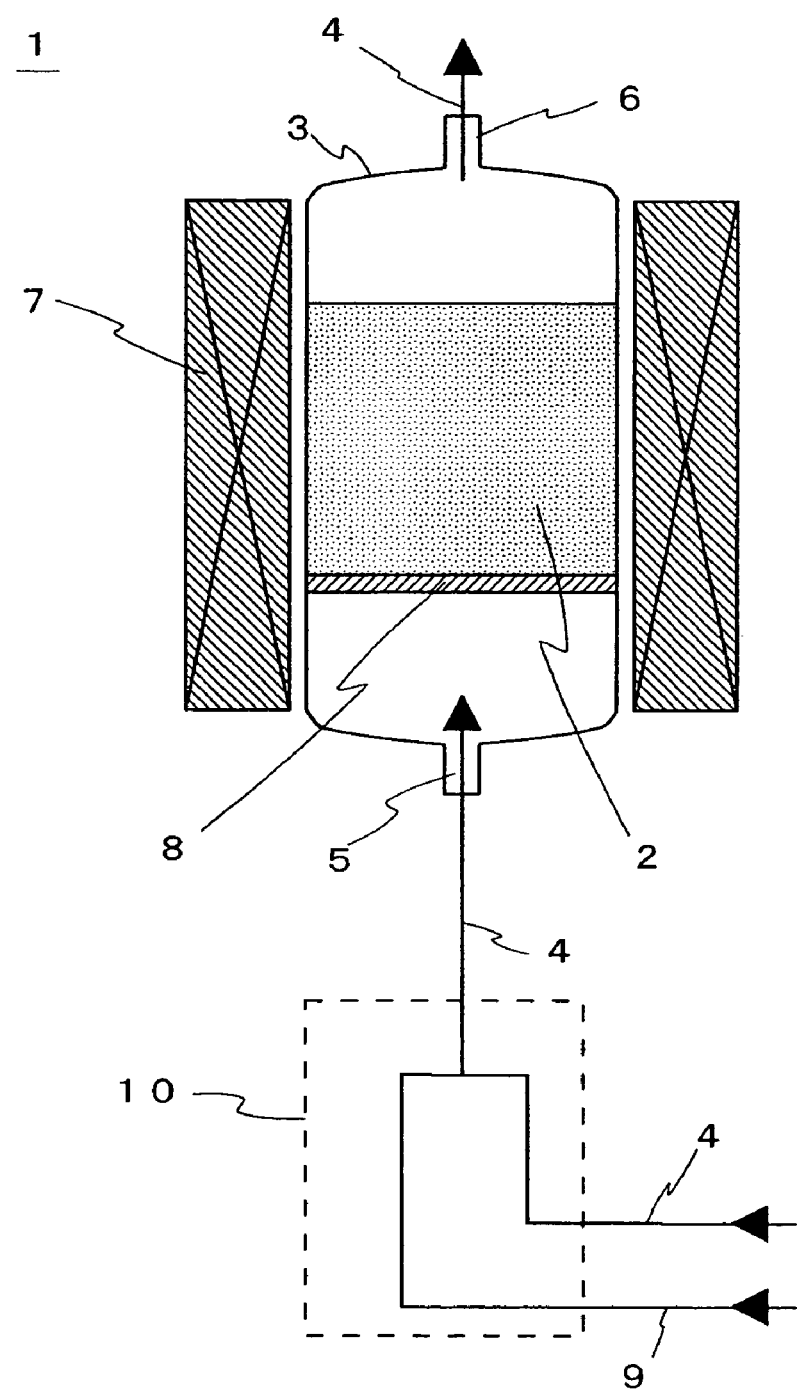
FIG. 1 illustrates the makeup of an apparatus for making *cladophora*-form carbon according to the present invention.

FIG. 1 illustrates the makeup of an apparatus for making a *cladophora*-form carbon according to the present invention. As shown, an apparatus 1 for making a *cladophora*-form carbon comprises a vertically arranged reaction vessel 3 containing fine diamond catalytic particles 2, an inlet 5 and an outlet 6 which are disposed at an upper and a lower part of the reaction vessel 3 for introducing and discharging a gas of hydrocarbon 4, respectively; a heating means 7 disposed so as to surround the reaction vessel 3 and a filter 8 disposed in said reaction vessel for passing the gas 4 while not passing the fine diamond catalytic particles 2, therethrough. The apparatus for making 1 may further include a gas mixing means 10 for mixing the gas of hydrocarbon 4 with a reaction assisting gas and/or a diluent gas 9. This apparatus will hereinafter be referred to as "flow gas phase synthesizer" as named by the present inventors.

By using this flow gas phase synthesizer 1, a *cladophora*-form carbon is made in a manner as described below.

A powder of fine diamond catalytic particles 2 whose surfaces are oxidized and have a catalyst of a transition metal carried thereon is placed on the filter 8 in the reaction vessel 3. For a method of preparing such a powder of fine diamond catalytic particles 2 whose surfaces are oxidized and have a catalyst of a transition metal carried thereon, reference is made, e.g., to JP 2004-277241 A.

With the fine diamond catalytic particles 2 placed in the reaction vessel 3, the gas of hydrogen 4 is introduced at the predetermined flow rate through the inlet 5 for discharge through the outlet 6. The flow rate of the gas 4 is selected such that the fine diamond catalytic particles 2 are floated and stirred within the reaction vessel 3 and is set so that such a state is visually confirmed in the vessel 3 if made of fused silica. For example, a flow rate is preferably such that the fine diamond catalytic particles 2 by being floated and stirred in the reaction vessel 3 do not fly out through the outlet 6. The fine diamond particles may be 500 nm or less in particle size and if too large are hard to be floated. The temperature is preferably selected to be in a range between 400° C. and 600° C. if use is made of Ni, Co or Pd as the catalyst and of methane as the gas of hydrocarbon. Also, since the Marimo carbon becomes larger in particle size in proportion to the time in which the fine diamond catalytic particles are being floated and stirred at the selected temperature, the reaction time may be set according to its end objectives.

Inasmuch as the carbon nano-materials that constitute the *cladophora*-form carbon become carbon nano-tubes if Ni or Co is selected as the transition metal and become coin stacked carbon nano-graphite materials if Pd is selected, the transition metal may be selected according to the end objectives of the *cladophora*-form carbon.

According to this method, since fine diamond catalytic particles are floated and stirred within the reaction vessel 3, the catalytic reaction takes place uniformly over the entire surface of an individual fine diamond catalytic particle and as a result carbon nano-materials which are equal in length are grown radially over the entire surface of the fine diamond catalytic particle, thus forming a fine particle in the form of a Marimo (*Cladophora sauteri*) particle.

An explanation is next given of further details of the present invention with reference to specific examples thereof.

A diamond powder of 500 nm or less in particle size on the market is used and first subjected to oxidation treatment according to a method as described, e.g., in JP 2004-277241 A. Since diamond particles on the market are not entirely of carbon but have oxygen attached on their surfaces, these surfaces are homogenized by oxidization in an oxygen atmosphere or in air at 350° C. to 450° C. Then, they are used as catalyst carriers.

In this way, the diamond powders whose surfaces are oxidized and have Ni, Co or Pd impregnated and carried thereon are prepared. An amount of 1 to 5 grams of these fine diamond catalytic particles prepared are placed in an apparatus as shown in FIG. 1 for reaction with a flow rate of 50 to 200 milliliters per minute of methane gas and at a reaction temperature of 400° C. to 600° C. In the apparatus, the reaction vessel 3 is cylindrical having an inner diameter of 4 cm and a length of 50 cm.

Figure 2:
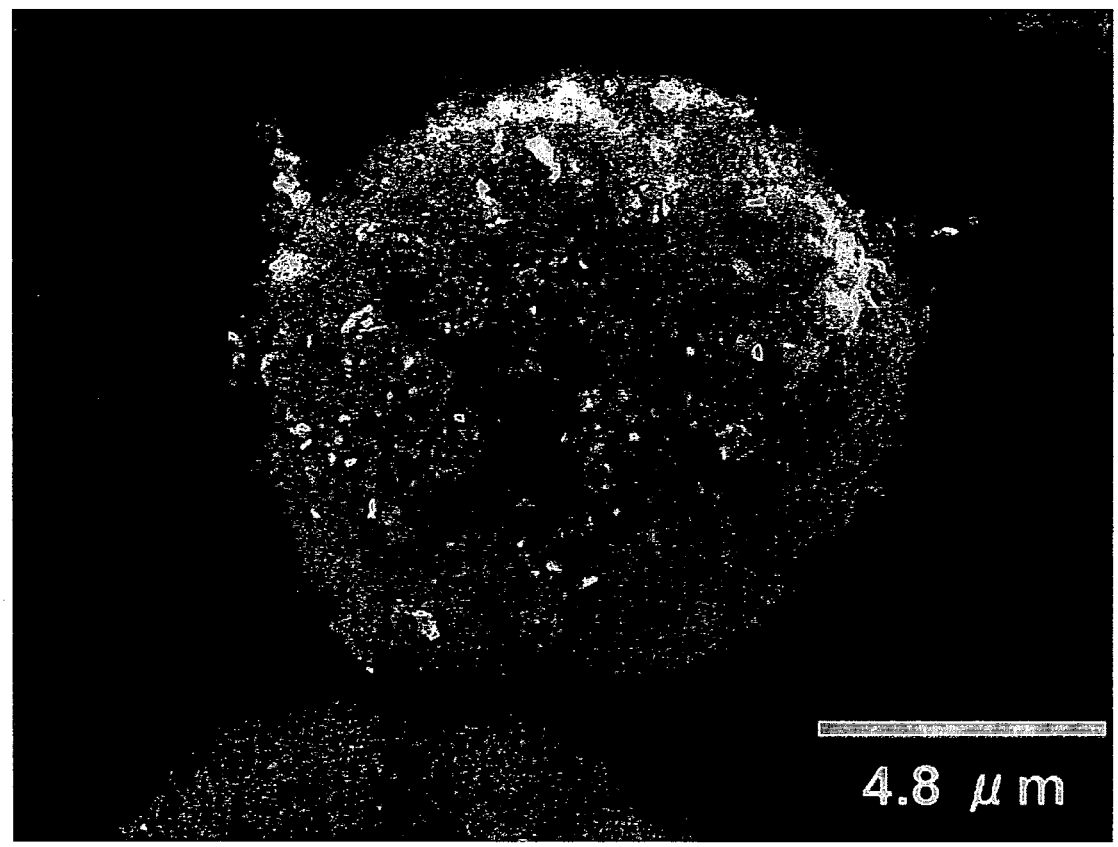
FIG. 2 is a picture showing an SEM image of a cladophora-form carbon particle according to the present invention.
Figure 3:
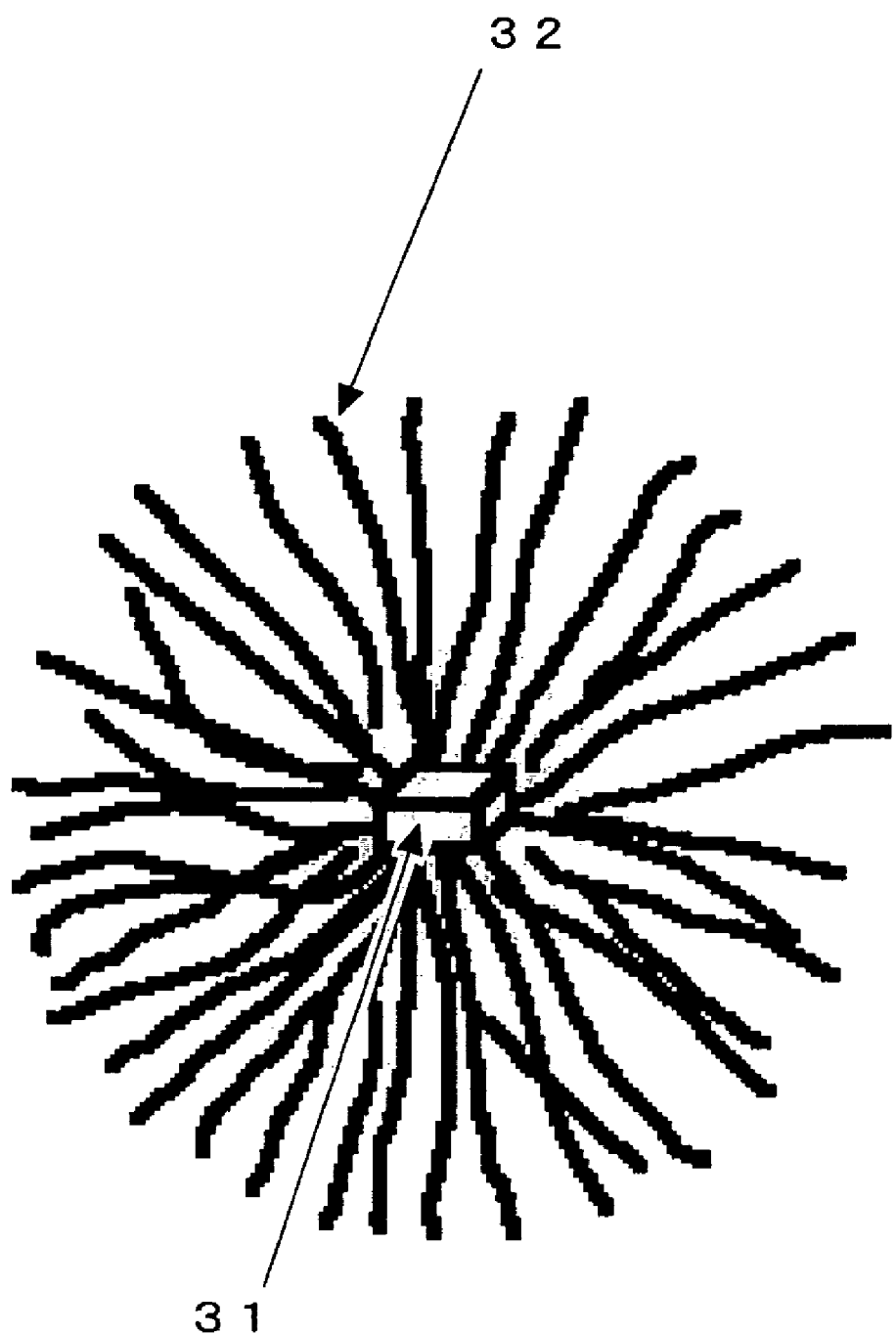
FIG. 3 illustrates the makeup of a *cladophora*-form carbon particle according to the present invention.

FIG. 2 shows an SEM (scanning electron microscope) image of a *cladophora*-form carbon particle which is formed in a reaction time of 1 hour from the fine diamond catalytic particle impregnated to carry Ni. From the image, it is seen that this fine particle is virtually spherical and has carbon nano-materials, each in the form of an extremely thin fiber or filament raised radially over the entire surface of the fine particle. That it is so seen is due to the fact that as is a structural model as shown in FIG. 3, nano fibers or filaments 32 having a diameter of nanometer size are grown radially from a fine diamond catalytic particle 31 as a core. Although not shown, a *cladophora*-form carbon particle likewise structured has been obtained with each of Co and Pd.

Figure 4:
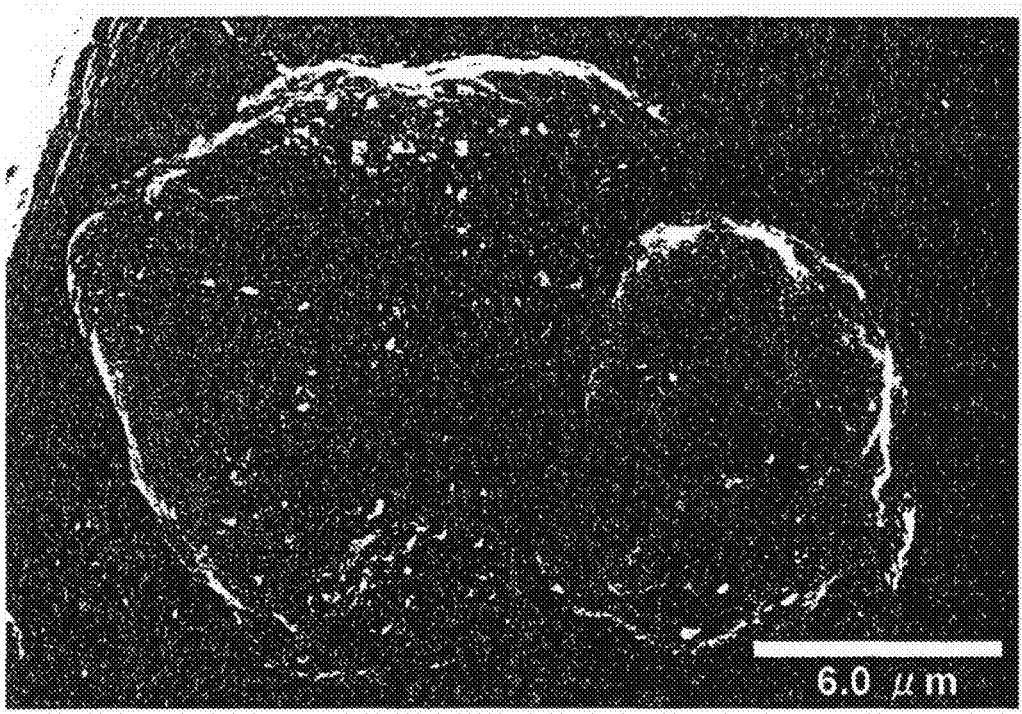
FIG. 4 is a picture showing an SEM image of a fine particle of carbon nano-material in the prior art.

FIG. 4 shows an SEM image, shown for a comparison purpose, of fine particles of carbon nano-material prepared according to the prior art, namely by the method described in JP 2004-277241 A. From the image, it is seen that these fine particles of carbon nano-material are indeterminate in shape, viz., the larger fine particle is shaped in the form of a pointed flat plate while the smaller fine particle has its bottom and top faces which are plate-like and spherical in shape, respectively. If a fine particle like such is shaped to be low in symmetry, the distance from its center to its surface varies variously depending on directions, to wits, the amount of carbon nano-material varies with shape directions; hence anisotropy in the amount of a catalyst carried and in mechanical strength is created.

On the other hand, if the *cladophora*-form carbon according to the present invention which has essentially no shape anisotropy, as shown in FIG. 3, is used as a strength reinforcing material, an electronic material, an electromagnetic absorbent material, a catalyst material or an optical material, then a uniform property not dependent on a direction or position can be obtained.

Figure 5:
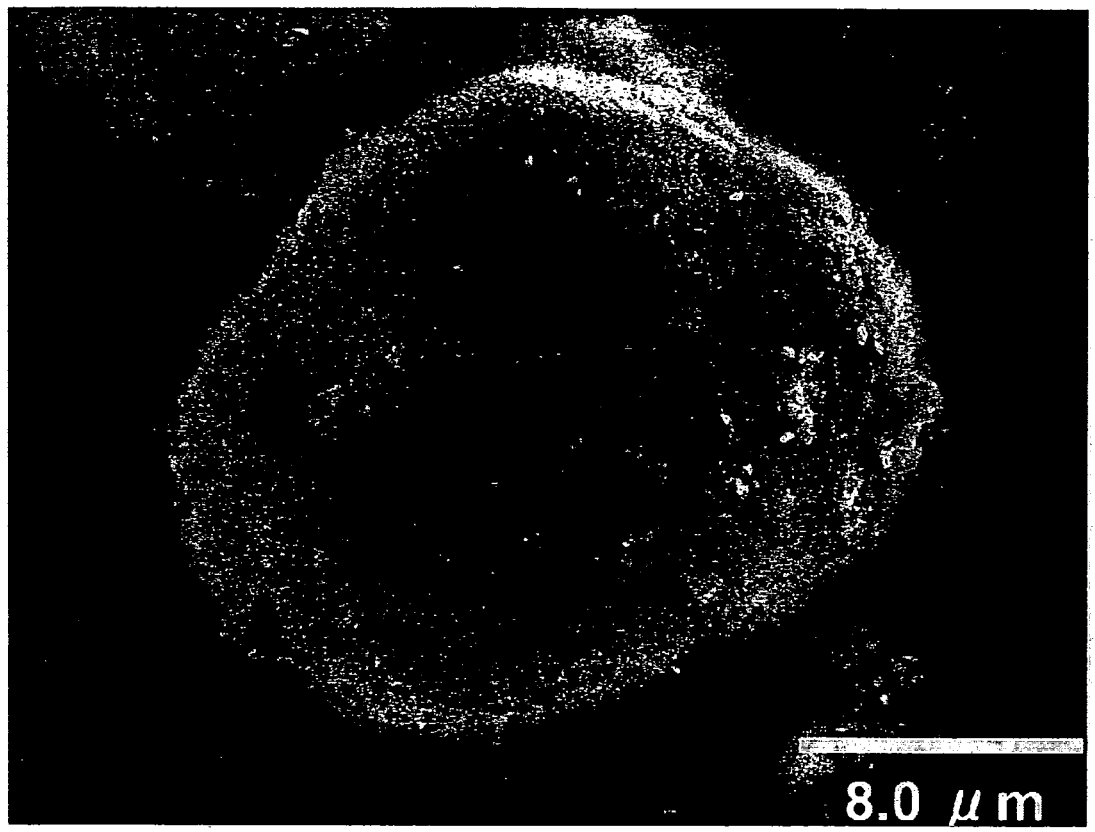
FIG. 5 is a picture showing an SEM image of a *cladophora*-form carbon according to the present invention which is prepared with the reaction time varied.
Figure 6:
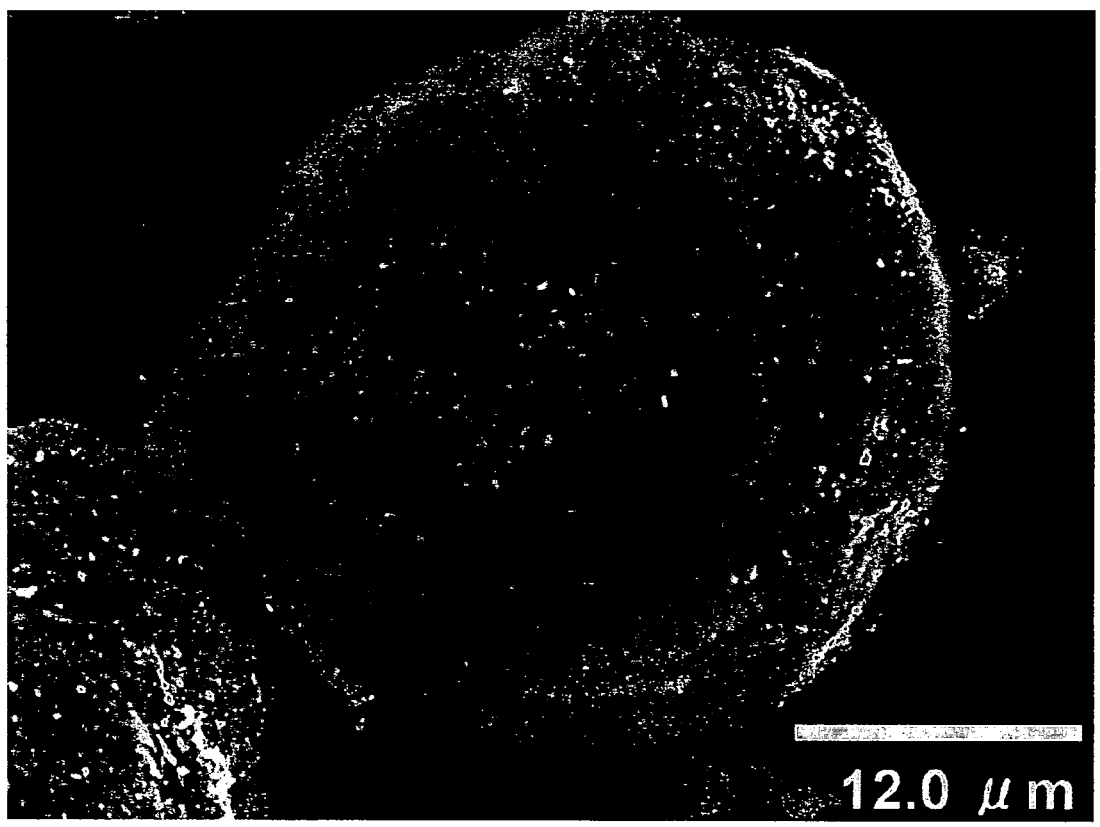
FIG. 6 is a picture showing an SEM image of a *cladophora*-form carbon according to the present invention which is prepared with the reaction time varied.

FIGS. 5 and 6 show SEM images of *cladophora*-form carbon particles which are made under the same conditions as those described in connection with FIG. 1 except that the reaction times are 3 hours and 5 hours, respectively. From these images, it is seen that the *cladophora*-form carbon particle has its particle size increased as the reaction time is increased.

Figure 7:
FIG. 7 is a picture showing a TEM image of a carbon nano-material portion of a *cladophora*-form carbon according to the present invention.

FIG. 7 shows a TEM (transmission electron microscope) image of a *cladophora*-form carbon that is made under the conditions described in connection with FIG. 1. From FIG. 7, it is seen that the carbon nano-materials of this *cladophora*-form carbon are monolayer carbon nano-tubes whose diameter is around 18 nm. The carbon nano-materials were also carbon nano-tubes in case that Co was used as a transition metal catalyst.

Figure 8:
FIG. 8 is a picture showing a TEM image of a carbon nano-material portion of a *cladophora*-form carbon according to the present invention.

FIG. 8 shows a TEM image of a carbon nano-material portion of a *cladophora*-form carbon that is made under the same conditions as described in connection with FIG. 1 except that Pd is used as the transition metal catalyst. It is seen that the carbon nano-materials of this *cladophora*-form carbon are coin stacked carbon nano-graphite whose diameter is around 27 nm.

Mention is next made of the yield of a *cladophora*-form carbon according to the method of the present invention. FIG. 9 is a table showing yields of the *cladophora*-form carbon according to the method of the present invention. Diamond powders of 500 nm or less in particle size on the market are used and are treated to carry various transition metals including Ni, Co, Pd and others, respectively, in an amount of 3.0% by weight by impregnation according to the conventional method to prepare powders of fine diamond catalytic particles. For each powder, an amount of 1.0 gram of the fine diamond catalytic particles prepared are placed in an apparatus as shown in FIG. 1 for reaction with a flow rate of 100 milliliters per minute of methane gas, at a reaction temperature of 550° C. for a reaction time of 0.5 hour. In the apparatus, the reaction vessel 3 is cylindrical having an inner diameter of 4 cm and a length of 50 cm. From FIG. 9, it is seen that the carbon nano-materials are higher in yield in the order of Ni>Co>Pd and are not formed with Fe, Ru, Rh, Ir or Pt.

Mention is next made of the dependence on the reaction time of the yield of a *cladophora*-form carbon according to the method of making of the present invention.

FIG. 10 is a table showing the dependence on the reaction time of the yield of *cladophora*-form carbon according to the method of making of the present invention. A diamond powder of 500 nm or less in particle size on the market is used and is treated to carry Ni by impregnation according to the conventional method to prepare a powder of fine diamond catalytic particles. An amount of 5 grams is placed in an apparatus as shown in FIG. 1 for reaction with a flow rate of 200 milliliters per minute, at a reaction temperature of 600° C. for a reaction time variously changed. In the apparatus, the reaction vessel 3 is cylindrical having an inner diameter of 4 cm and a length of 50 cm.

By the "yield" is meant the ratio of the number of moles of formed *cladophora*-form carbon to that of supplied methane. From FIG. 10, it is seen that the longer the reaction time, the greater is the yield and that if the reaction time is prolonged, then an extremely high yield is obtained; hence a reduced cost. It is also seen that a *cladophora*-form carbon particle becomes greater in diameter practically in proportion to the reaction time and its particle size can be controlled by the reaction time.

Mention is next made of the particle size distribution of *cladophora*-form carbon particles made according to the method of the present invention.

Figure 11:
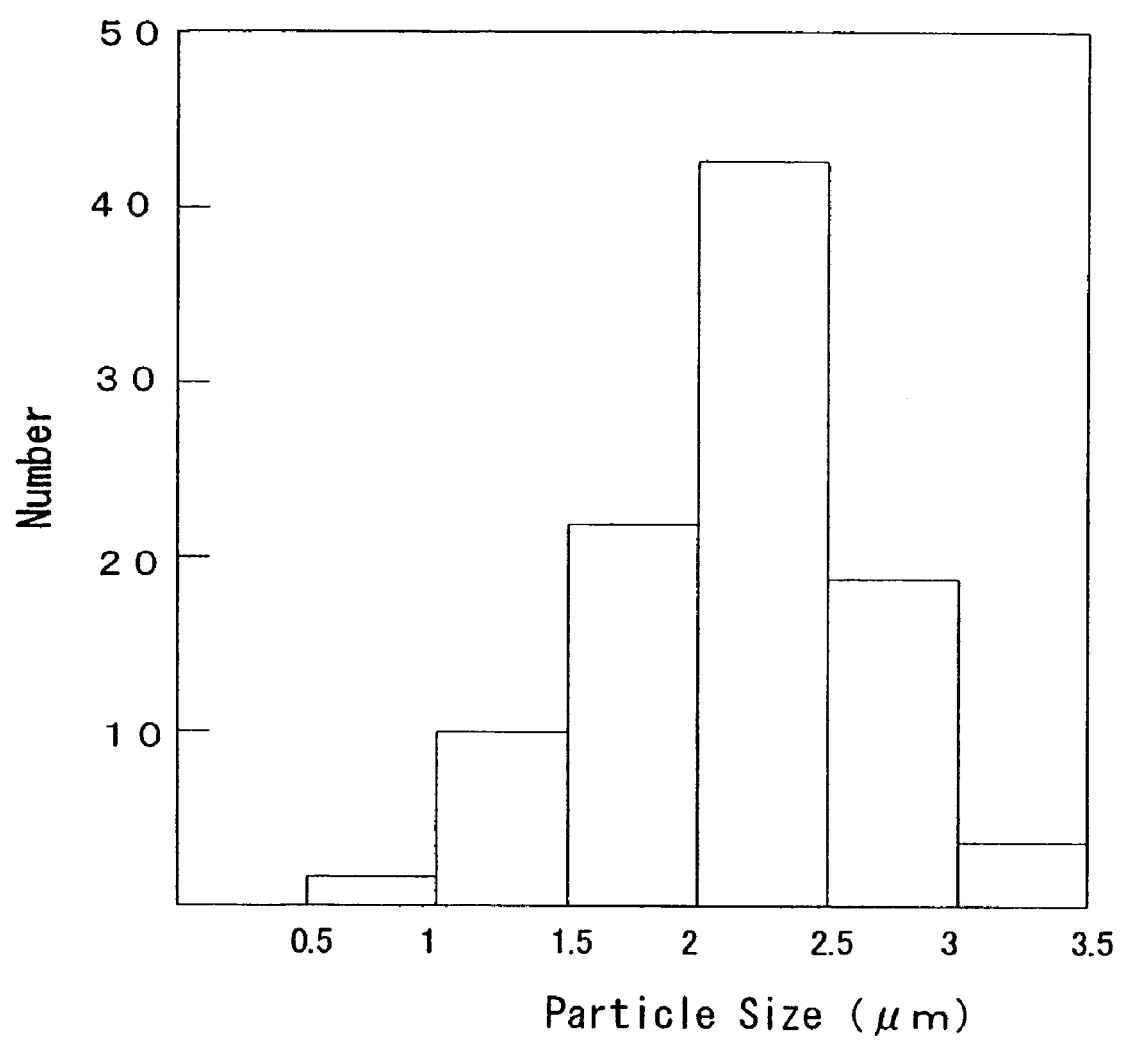
FIG. 11 is a graph showing the particle size distribution of a *cladophora*-form carbon which was obtained by the method of making of the present invention with a reaction time of 0.5 hour.

FIG. 11 is a graph showing the particle size distribution of a *cladophora*-form carbon that is made under the *cladophora*-form carbon growth conditions described in connection with FIG. 10 with a reaction time of 0.5 hour. In the graph, the abscissa axis represents the *cladophora*-form carbon particle size and the ordinate axis represents the frequency (number).

Figure 12:
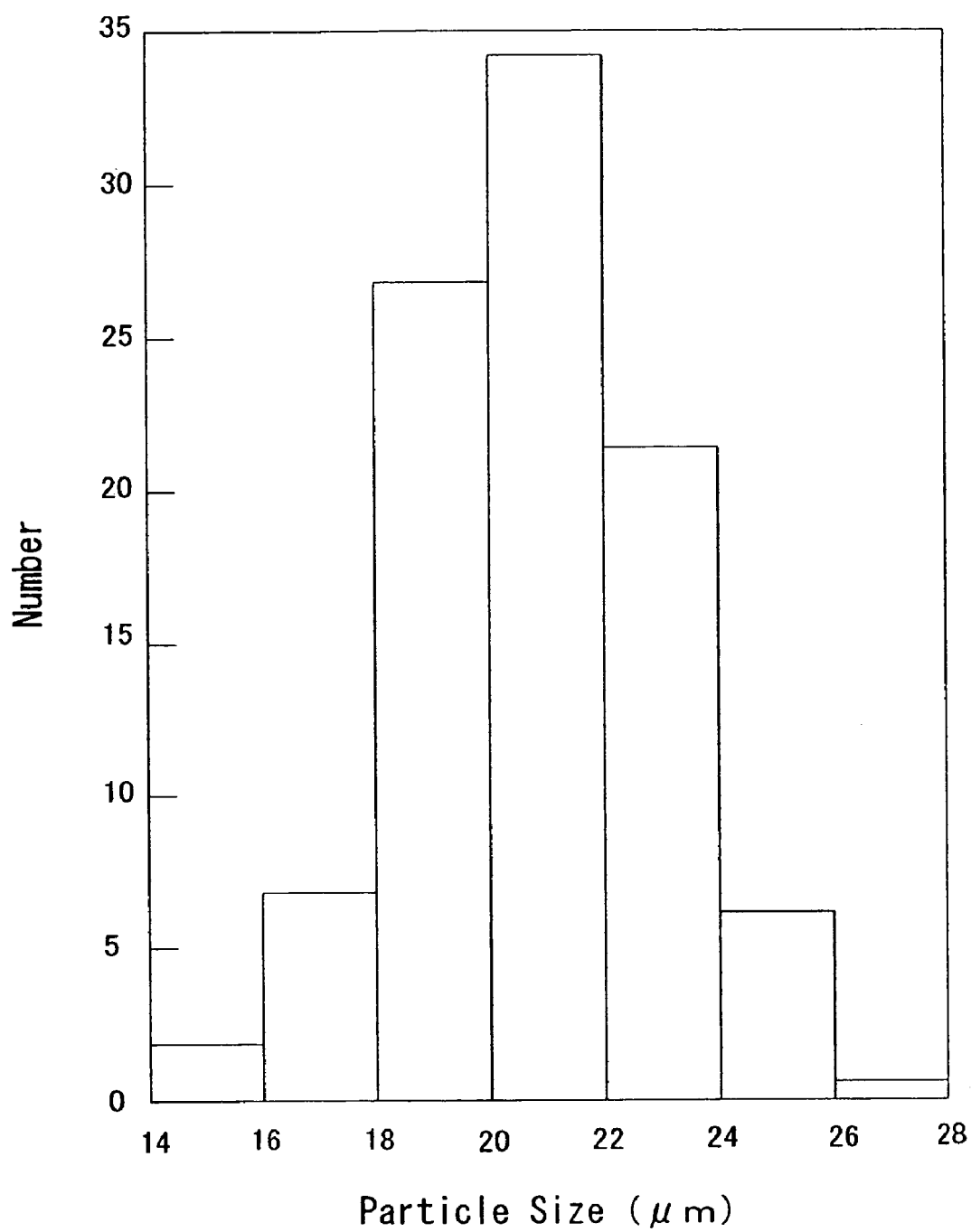
FIG. 12 is a graph showing the particle size distribution of a *cladophora*-form carbon which was obtained by the method of making of the present invention with a reaction time of 5 hours.
Figure 13:
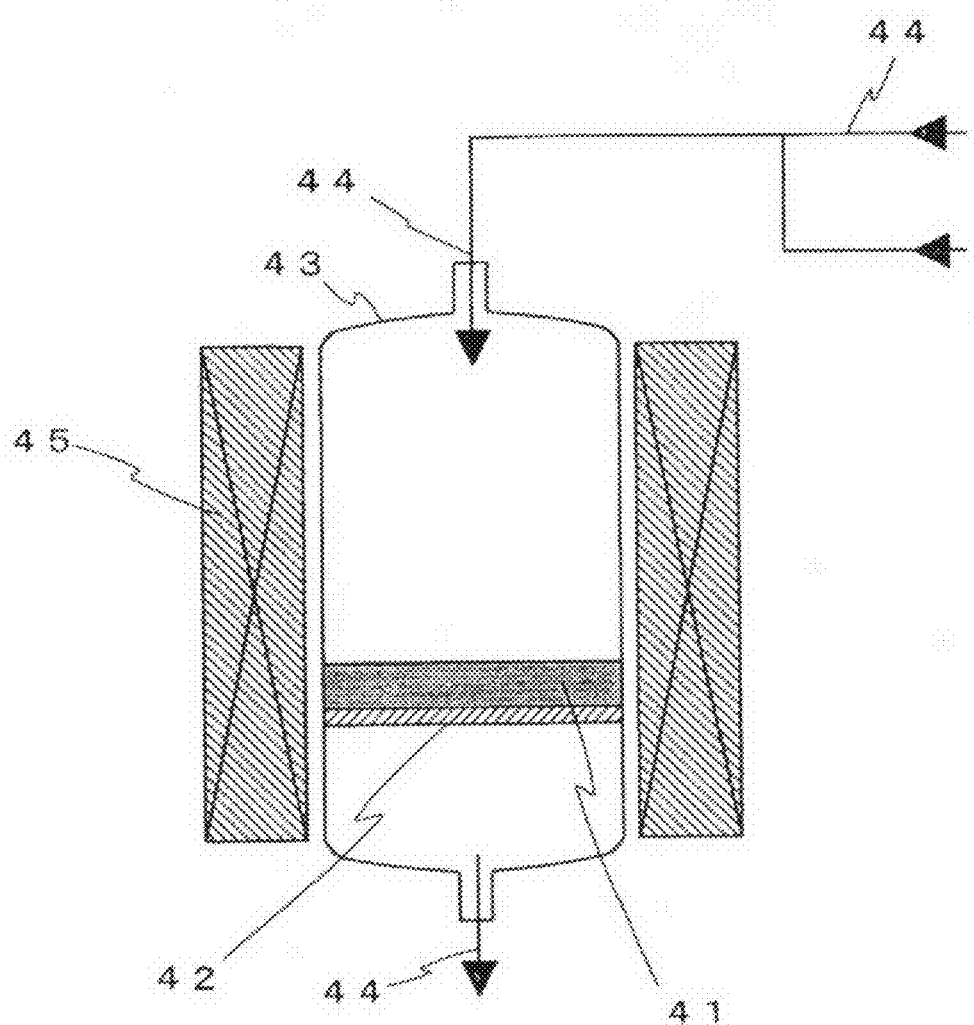
FIG. 13 illustrates the makeup of an apparatus for making carbon nano-materials according to the prior art.

FIG. 12 is a graph showing the particle size distribution of a *cladophora*-form carbon which is made under the *cladophora*-form carbon growth conditions described in connection with FIG. 10 with a reaction time of 5 hours. In the graph, the abscissa axis represents the *cladophora*-form carbon particle size and the ordinate axis represents the frequency (number).

From FIGS. 11 and 12, it is seen that the *cladophora*-form carbon particle size distribution is relatively narrow. It is also seen that the *cladophora*-form carbon particle size can be controlled by the reaction time.

It has also been found that the *cladophora*-form carbon particle size can be controlled fully in a range of 1 μm to 100 μm and if it exceeds 100 μm, the *cladophora*-form carbon particles tend to collide with each other and with tube walls and as a result their shape destruction becomes conspicuous.

INDUSTRIAL APPLICABILITY

As will be understood from the foregoing description, a *cladophora*-form carbon according to the present invention when used as strength reinforcing, electronic, electromagnetic absorbent, catalyst or optical materials, can exhibit properties for their individual purposes that are very uniform in contrast to those with the conventional carbon nano-materials which are not spherical in shape. Also, the method of and the apparatus for making a *cladophora*-form carbon according to the present invention make it possible to make the *cladophora*-form carbon at a reduced cost and in a large quantity.

As will be understood from the foregoing description, a *cladophora*-form carbon according to the present invention which comprises a fine spherical particle having fibrous or filamentary carbon nano-materials radially grown from a fine diamond catalytic particle as a core can be used as strength reinforcing, electronic, electromagnetic absorbent, catalyst and optical materials to exhibit properties for their individual purposes, which are uniform.

What is claimed is:

1. A *cladophora*-form carbon comprising
    a fine spherical particle made of a fine diamond particle whose surface is oxidized,
    a transition metal catalyst of any one of Ni, Co, and Pd carried on the surface of the oxidized fine diamond particle, and
    carbon nano-materials grown radially over the entire surface of the transition metal catalyst.

2. The *cladophora*-form carbon as set forth in claim 1, characterized in that said transition metal catalyst is Ni or Co and that said carbon nano-materials are carbon nano-tubes.

3. The *cladophora*-form carbon as set forth in claim 1, characterized in that said transition metal catalyst is Pd and that said carbon nano-materials have coin stacked structures and are made of carbon nano-graphite.

4. A method of making a *cladophora*-form carbon, characterized in that it comprises:

preparing fine diamond catalytic particles whose surfaces are oxidized and have a catalyst of a transition metal of any one of Ni, Co, and Pd carried thereon to form fine diamond catalytic particles;

said fine diamond catalytic particles are fluidized and stirred in a gas phase consisting of a hydrocarbon to form a fluidized gas phase state, a carbon nano-material is grown radially over the entire surface of said fine diamond catalytic particles, and a *cladophora*-form carbon is manufactured which comprises:

a fine spherical particle made of said oxidized fine diamond particles;

said transition metal catalyst carried on the surface of said oxidized fine diamond particle; and said carbon nano-materials grown radially over the entire surface of the transition metal catalyst.

5. The method of making a *cladophora*-form carbon as set forth in claim 4, characterized in that said transition metal carried on the oxidized surface of said fine diamond particle is Ni or Co and that said carbon nano-materials grown on said fine diamond catalytic particle surface by floating and stirring in a gas phase of hydrocarbon while heating them to a catalytic reaction temperature sufficient to synthesize carbon nano-materials, and said carbon nano-material grown on the surface of said fine diamond catalytic particle is a carbon nano-tube.

6. The method of making a *cladophora*-form carbon as set forth in claim 4, characterized in that said transition metal carried on the oxidized surface of said fine diamond particle is Pd and that said carbon nano-materials grown on said fine diamond catalytic particle surface by floating and stirring in a gas phase of hydrocarbon while heating them to a catalytic reaction temperature sufficient to synthesize carbon nano-materials, and said carbon nano-material grown on the surface of said fine diamond catalytic particle has a coin stacked structure and is made of carbon nano-graphite.

7. The method of making a *cladophora*-form carbon as set forth in any one of claims 5 or 6, characterized in that said catalytic reaction temperature is a temperature ranging between 400° C. and 600° C.

8. The method of making a *cladophora*-form carbon as set forth in any one of claims 4 to 6, characterized in that said oxidized fine diamond particle has a particle size of not greater than 500 nm.

9. The method of making a *cladophora*-form carbon as set forth in any one of claims 4 to 6, characterized in that said hydrocarbon is methane.

* * * * *